United States Patent [19]
Larsson

[11] Patent Number: 5,853,782
[45] Date of Patent: Dec. 29, 1998

[54] ARRANGEMENT AND METHOD FOR CONTINUOUS ADDITION OF NITROGEN GAS TO A BEVERAGE

[75] Inventor: Ebbe Larsson, Genarp, Sweden

[73] Assignee: Alfa Laval AB, Lund, Sweden

[21] Appl. No.: 714,146

[22] PCT Filed: Dec. 4, 1995

[86] PCT No.: PCT/SE95/01449

§ 371 Date: Sep. 16, 1996

§ 102(e) Date: Sep. 16, 1996

[87] PCT Pub. No.: WO96/17529

PCT Pub. Date: Jun. 13, 1996

[30] Foreign Application Priority Data

Dec. 5, 1994 [SE] Sweden .................................. 9404210

[51] Int. Cl.[6] .................................. A23L 2/00; C12G 3/00
[52] U.S. Cl. ........................ 426/474; 261/122.1; 426/519; 426/592
[58] Field of Search .................................. 426/474, 519, 426/592; 261/122.1; 99/473

[56] References Cited

U.S. PATENT DOCUMENTS

| | | | |
|---|---|---|---|
| 3,728,129 | 4/1973 | Sargeant | 426/474 |
| 4,610,888 | 9/1986 | Teng et al. | 426/569 |
| 5,049,320 | 9/1991 | Wang et al. | 261/122.1 |

FOREIGN PATENT DOCUMENTS 2247225  2/1992  United Kingdom.

*Primary Examiner*—George Yeung
*Attorney, Agent, or Firm*—Fish & Richardson P.C.

[57] ABSTRACT

An arrangement for continuous addition of nitrogen gas to a beverage such as beer, mineral water or still drink comprises a pump (2) arranged to increase the pressure of a flow of beverage to a desired high level. In the arrangement there are also tubes (5) to add a predetermined amount of nitrogen gas under pressure directly to the pressurized flow of beverage and at least one static mixer (4) to mix gas and beverage and disperse the nitrogen gas in the beverage. A holding cell is connected to the static mixer in which holding cell the nitrogen gas is completely dissolved in the still pressurized beverage of the holding cell. Valves (15) are arranged at the outlet of the holding cell to lower the pressure to a level which is suitable for packaging of the beverage.

13 Claims, 1 Drawing Sheet

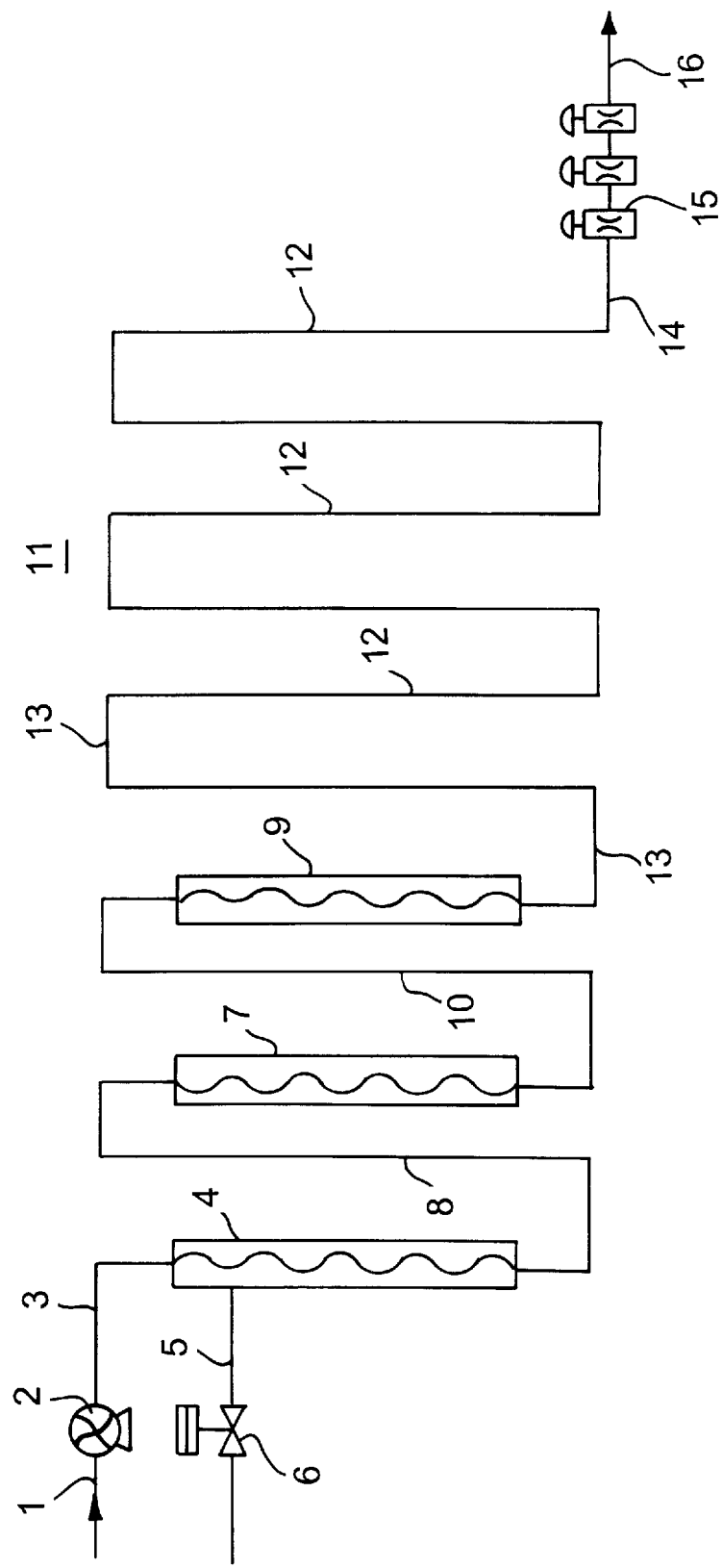

ARRANGEMENT AND METHOD FOR CONTINUOUS ADDITION OF NITROGEN GAS TO A BEVERAGE

FIELD OF THE INVENTION

The present invention relates to an arrangement for continuous addition of nitrogen gas to a beverage such as beer, mineral water or still drink and method for continuous addition of nitrogen gas to a beverage as beer in said arrangement.

BACKGROUND OF THE INVENTION

By addition of a certain amount of nitrogen to beer in connection with the production it is known that the beer foam that is formed by beer dispensed in connection with consumption will be more firm and stable. With the present technique this addition takes place by adding nitrogen gas to the beer in tanks or conduits by way of scattering means as for example sinter tubes. The amount of nitrogen gas which is dissolved in the beer is hard to control during such conditions and an uncontrolled foaming during the production may lead to a loss of foam forming proteins.

In some connections it is desirable to add nitrogen gas also to mineral water or still drinks since the nitrogen gas, which is set free in connection with pouring the beverage into glasses, forms smaller gas bubbles than the $CO_2$, bubbles which means that the rising speed of the bubbles of nitrogen gas is slower. The sparkling character of the beverage will consequently remain during a longer time.

SUMMARY OF THE INVENTION

According to the invention there is now proposed a solution to the problem of controlling the amount of nitrogen gas which is dissolved in a beverage of a kind mentioned above during continuous operation. The invention comprises an arrangement which is mainly characterized in that it comprises means arranged to increase the pressure in a flow of beverage to a desired high level, means to add a predetermined amount of nitrogen gas under pressure directly into the pressurized flow of beverage, at least one static mixer to mix gas and beverage and to disperse the nitrogen gas in the beverage, a holding cell in which the nitrogen gas is completely dissolved in the still pressurized beverage and means at the outlet of the holding cell, which means are arranged to lower the pressure to a suitable level for packaging of the beverage.

The pressure increasing means is suitably arranged to increase the pressure of the beverage to at least 10 bar. If the arrangement according to the invention is connected after a pasteurizing plant the pressure of the beverage at the outlet from this is 6–7 bar. If the beverage arrives from a storage tank the pressure is lower and the increase of pressure then takes place in two stages.

The pressure increasing means may with advantage consist of a centrifugal pump. The pump is frequency controlled if the flow of beverage is varying. Otherwise the pump works with a constant number of revolutions.

The static mixer is suitably provided with an inlet for nitrogen gas under pressure. The inlet consists in its simplest form of a thin tube which ends in the mixer. The advantage of adding the nitrogen gas to the mixer is that the flow in the same already is turbulent.

According to the invention the static mixer comprises at least four twisted mixing elements, at which the direction of flow is changed at least four times. The number of static mixers which are present in the arrangement depends on the flow, the temperature and the desired amount of dissolved nitrogen.

Suitably, the holding cell in the arrangement according to the invention comprises vertically arranged tube elements through which the pressurized beverage containing nitrogen gas is brought to flow alternating upwards and downwards. By arranging the holding cell in this way there is obtained a further mixing at each bend of the tubes, which makes it easier for the nitrogen gas to be completely dissolved in the beverage.

If such is desired, an apparatus which measures the content of nitrogen gas in the beverage is arranged at the inlet to the arrangement in front of the pressure increasing means. These measurements are conveyed to means which are arranged to adjust the amount of added nitrogen gas to the desired end content in the beverage. Such an arrangement is of value especially if the beverage at the inlet to the arrangement has a varying content of nitrogen. If the content is constant a simpler quota controlling system may be used which adds a predetermined amount of nitrogen gas to a given flow of beverage.

The arrangement according to the invention is arranged such that it may be sterilized in its entirety in that the inlet may be connected to high pressure steam, hot water or chemical sterilizing agents.

The method according to the invention relates to addition of nitrogen gas to a beverage such as beer and this is mainly characterized in that the beer is directed to the arrangement with a temperature below 15° C. The pressure of the beer is increased to at least 10 bar, preferably 12 bar. The nitrogen gas is added with a pressure above 12 bar, preferably 14 bar. The holding time at this high pressure is 10–30 sec. The beer has a nitrogen content of up to 35 ppm at $CO_2$ contents up to 5 g/l after packaging.

BRIEF DESCRIPTION OF THE DRAWING

The invention is described further with reference to the attached drawing which shows an embodiment of an arrangement according to the invention chosen as an example.

DETAILED DESCRIPTION

A flow 1 of beverage is led to a pressure increasing pump 2. From this the beverage is directed to a static mixer 4 by way of a conduit 3. In the upper part of the mixer there is an inlet for a tube 5 through which pressurized nitrogen gas which is sterile filtered is added to the beverage in the static mixer. In the tube 5 there is a cut off valve 6. The pressurized beverage and the nitrogen gas are mixed in the static mixer and the gas is dispersed in the flow of liquid due to the diversions in the flow direction which is forced upon the beverage and the gas by the twisted mixing elements in the mixer. The number of mixing elements and the number of changes of the flow direction may vary according to demand. The number of mixing elements should, however, be at least four and the number of changes at least two in order to obtain the desired dispersion of nitrogen gas. After passage of the first static mixer the mixture of beverage and nitrogen gas is directed further to a second static mixer 7 by way of a conduit 8 and from this to a third static mixer 9 by way of a conduit 10. From the third static mixer the gas containing beverage is being passed through a holding cell 11 comprising a number of vertically arranged tube elements 12 connected with tube bends 13. During the passage through the holding cell the added nitrogen gas is completely dissolved in the beverage. The holding time for the beverage in the holding cell is about 10–30 seconds. When the beverage leaves the holding cell by way of a conduit 14 it is still under high pressure. The beverage is therefore forced to pass a number of pressure controlling valves 15, which lower the pressure of the beverage in a number of steps to a pressure suitable for packaging. Due to the stepwise lowering of the pressure the nitrogen gas is detained in the beverage in dissolved form and the beverage is led further through a conduit 16 for packaging in bottles or cans.

The arrangement is designed such that all components that are in contact with the beverage consist of stainless steel.

The amount of nitrogen gas which may be added to the beverage depends on its content of $CO_2$. The lower the $CO_2$ content the easier it is to dissolve the nitrogen gas. A low temperature of the beverage makes it easier to dissolve the nitrogen gas in the same.

The beer is directed to the described arrangement with a temperature of 10°. The pump 2 increases the pressure of the beer to 12 bar. Through the inlet 5 nitrogen gas is added with a pressure of 14 bar. After passage of the arrangement the pressure in the valves 11 is lowered to a tapping pressure of 2 bar. Depending on the content of $CO_2$ the amount of nitrogen gas which is dissolved may vary, but at a content below 5 g/l $CO_2$ up to 35 ppm nitrogen may be dissolved in the beer.

The capacity of an arrangement according to the invention may vary between 100–800 hl/h.

What is claimed is:

1. An arrangement for a continuous addition of nitrogen gas to a beverage comprising means (2) arranged to increase the pressure of a flow of beverage to a desired level, means (5) to add a predetermined amount of nitrogen gas under pressure directly into the pressurized flow of beverage, at least one static mixer (4) to mix gas and beverage and to disperse the nitrogen gas in the beverage, a holding cell (11) in which the nitrogen gas is completely dissolved in the still pressurized beverage and means (15) arranged at the outlet from the holding cell to lower the pressure of the beverage to a level which is suitable for packaging the beverage.

2. The arrangement according to claim 1, wherein the pressure increasing means (2) comprises a pump which can increase the pressure of the beverage up to at least 10 bar.

3. The arrangement according to claim 1, wherein said means (2) comprises at least one centrifugal pump.

4. The arrangement according to claim 1, wherein the at least one static mixer (4) is provided with an inlet (5) for pressurized nitrogen gas.

5. The arrangement according to claim 4, wherein the at least one static mixer (4) comprises at least four twisted mixing elements, at which the direction of flow is changed at least twice.

6. The arrangement according to claim 1, wherein the holding cell (11) comprises vertically arranged tube elements (12) through which the pressurized beverage containing nitrogen gas is brought to flow alternately upwards and downwards.

7. The arrangement according to claim 1, further comprising an apparatus which measures the content of nitrogen gas in the beverage preceding the pressure increasing means, at which apparatus, means are arranged to adjust the amount of added nitrogen gas to a desired end content in the beverage.

8. The arrangement according to claim 4, wherein the inlet is connected to a source of a sterilization agent.

9. A method for the continuous addition of nitrogen gas to a beverage comprising the steps of directing the beverage to an arrangement for adding the nitrogen gas while the beverage is at a temperature of no greater than 15° C., increasing the pressure of the beverage to at least 10 bar, adding the nitrogen gas to the beverage through at least one static mixer at a pressure above 12 bar, maintaining the beverage at said pressure above 12 bar for 10–30 seconds, and passing the beverage through means arranged to lower the beverage pressure to one suitable for packaging such that the beverage after packaging has a nitrogen gas content of up to 35 ppm at a $CO_2$ content up to 5 g/l.

10. The method of claim 9, wherein the beverage is selected from the group consisting of beer, mineral water and still drinks.

11. The method of claim 10, wherein the beverage is beer.

12. The method of claim 9, wherein the increased pressure of the beverage is at least 12 bar.

13. The method of claim 9, wherein the nitrogen gas is added to the beverage at a pressure of 14 bar.

* * * * *